United States Patent
Sato

(10) Patent No.: US 10,348,958 B2
(45) Date of Patent: Jul. 9, 2019

(54) IMAGE PROCESSING APPARATUS FOR PERFORMING PREDETERMINED PROCESSING ON A CAPTURED IMAGE

(71) Applicant: CASIO COMPUTER CO., LTD., Shibuya-ku, Tokyo (JP)

(72) Inventor: Takeshi Sato, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 72 days.

(21) Appl. No.: 15/173,389

(22) Filed: Jun. 3, 2016

(65) Prior Publication Data
US 2017/0054898 A1    Feb. 23, 2017

(30) Foreign Application Priority Data

Aug. 20, 2015   (JP) .................. 2015-162907

(51) Int. Cl.
| | | |
|---|---|---|
| *H04N 5/232* | (2006.01) | |
| *G06K 9/60* | (2006.01) | |
| *H04N 9/04* | (2006.01) | |
| *H04N 1/62* | (2006.01) | |
| *G06K 9/00* | (2006.01) | |

(52) U.S. Cl.
CPC ........... *H04N 5/23219* (2013.01); *G06K 9/60* (2013.01); *H04N 1/62* (2013.01); *H04N 1/624* (2013.01); *H04N 9/045* (2013.01); *G06K 9/00228* (2013.01); *H04N 2201/0084* (2013.01)

(58) Field of Classification Search
CPC ...... H04N 5/23219; H04N 1/624; H04N 1/62; H04N 9/045; H04N 2201/0084; G06K 9/60; G06K 9/00228
See application file for complete search history.

(56) References Cited

U.S. PATENT DOCUMENTS

| 6,816,611 B1 | 11/2004 | Hagiwara et al. |
| 7,583,308 B2 | 9/2009 | Kanai et al. |

(Continued)

FOREIGN PATENT DOCUMENTS

| JP | 2000048184 A | 2/2000 |
| JP | 2006157617 A | 6/2006 |

(Continued)

OTHER PUBLICATIONS

Japanese Office Action (and English translation thereof) dated Oct. 20, 2016, issued in counterpart Japanese Application JP 2015-162907.
Japanese Office Action dated Jan. 8, 2019 (and English translation thereof) issued in counterpart Japanese Application No. 2017-081455.

*Primary Examiner* — Mekonnen D Dagnew
(74) *Attorney, Agent, or Firm* — Holtz, Holtz & Volek PC

(57) ABSTRACT

Predetermined processing is reliably performed on an image captured when a person serving as a photographic subject is photographed. When a person's face is detected in an image captured by an imaging section, a control section performs predetermined image processing on the captured image. If a person's face is not detected, the control section judges whether the predetermined processing is required to be performed on the captured image and, when judged that the predetermined processing is required to be performed, gives an instruction to perform the predetermine processing on the captured image.

9 Claims, 9 Drawing Sheets

(56) References Cited

U.S. PATENT DOCUMENTS

| | | |
|---|---|---|
| 8,212,894 B2 | 7/2012 | Nozaki et al. |
| 2007/0024738 A1 | 2/2007 | Kanai et al. |
| 2007/0041640 A1* | 2/2007 | Tabata .................... G06T 5/008 382/173 |
| 2008/0158407 A1* | 7/2008 | Funamoto .......... G06K 9/00228 348/345 |
| 2009/0295926 A1* | 12/2009 | Miyazaki ........... H04N 5/23219 348/169 |
| 2010/0214437 A1* | 8/2010 | Kim ........................ H04N 5/21 348/223.1 |
| 2015/0049924 A1* | 2/2015 | Tang ....................... G06T 11/60 382/118 |
| 2015/0172539 A1* | 6/2015 | Neglur ............... H04N 5/23206 348/207.1 |

FOREIGN PATENT DOCUMENTS

| | | |
|---|---|---|
| JP | 2007041046 A | 2/2007 |
| JP | 2007180892 A | 7/2007 |
| JP | 2009065269 A | 3/2009 |
| JP | 2009171301 A | 7/2009 |
| JP | 2010028418 A | 2/2010 |
| JP | 2010166263 A | 7/2010 |
| JP | 2010211497 A | 9/2010 |
| JP | 2010226416 A | 10/2010 |
| JP | 5168026 B2 | 3/2013 |
| JP | 5239126 B2 | 7/2013 |

\* cited by examiner

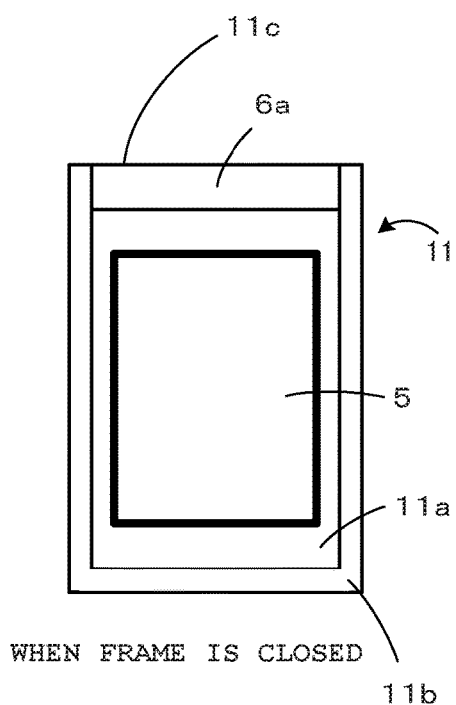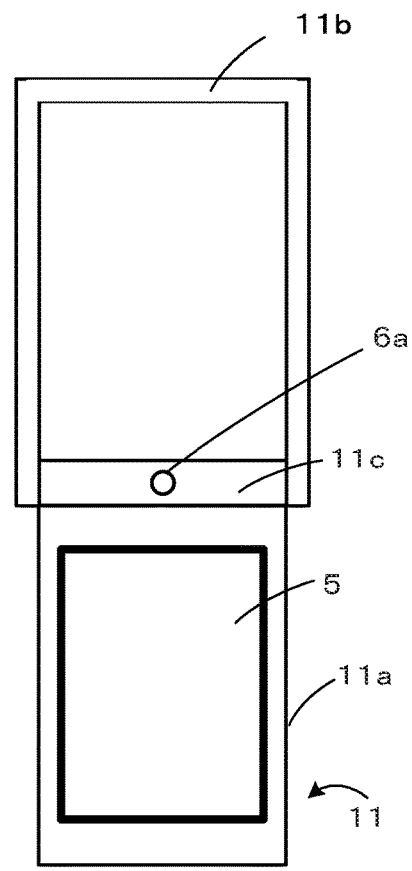
WHEN FRAME IS CLOSED
WHEN FRAME IS OPENED
FIG. 2A
FIG. 2B

FACE-DETECTED AREA WHEN FACE IS DETECTED

SKIN COLOR AREA WHEN FACE IS NOT
DETECTED BY TURNING SIDEWAYS

FACE-DETECTED AREA AND HAIR AREA
WHEN FACE IS DETECTED

☐ FACE-DETECTED AREA

☐ HAIR AREA (FACE-DETECTED AREA IS NOT INCLUDED)

POSSIBLE FACE AREA AND HAIR AREA WHEN FACE
IS NOT DETECTED BY TURNING SIDEWAYS

☐ POSSIBLE FACE AREA

☐ HAIR AREA (POSSIBLE FACE AREA IS NOT INCLUDED)

IMAGE PROCESSING APPARATUS FOR PERFORMING PREDETERMINED PROCESSING ON A CAPTURED IMAGE

CROSS-REFERENCE TO RELATED APPLICATION

This application is based upon and claims the benefit of priority from the prior Japanese Patent Application No. 2015-162907, filed Aug. 20, 2015, the entire contents of which are incorporated herein by reference.

BACKGROUND OF THE INVENTION

1. Field of the Invention

The present invention relates to an image processing apparatus, an image processing method, and a storage medium.

2. Description of the Related Art

Some imaging apparatuses such as digital still cameras and video cameras have a facial beautification processing function capable of beautifully imaging a face in a manner called skin beautification or skin whitening. If this facial beautification processing function is operated in a scene with no person, a portion with a color similar to the skin color blurs or becomes whitish. Therefore, the facial beautification processing function is operated in image capturing on condition that a persons face is included in a captured image (live view image). For example, an imaging apparatus has been conventionally proposed in which, as a facial beautification processing function, the face of a subject (for example, a person to be photographed) is detected in portrait photography, and exposure correction, soft focusing correction, and skin beautification correction are performed on a captured image, as disclosed in Japanese Patent No. 5239126. Also, a technique has been proposed in which whether a person's face is included in a captured image is detected and, if a person's face is included, its lip area is further detected and subjected to gloss processing, as disclosed in Japanese Patent Application Laid-Open (Kokai) Publication No. 2009-065269.

SUMMARY OF THE INVENTION

In accordance with one aspect of the present invention, there is provided an image processing apparatus comprising: a processor that is configured to acquire a captured image; detect a person's face in the captured image; perform predetermined processing on the captured image when the person's face is detected, judge whether the predetermined processing is required to be performed on the captured image when the person's face is not detected; and perform the predetermined processing even on the captured image from which the person's face has not been detected, when a judgment is made that the predetermined processing is required to be performed.

In accordance with another aspect of the present invention, there is provided an image processing method comprising: acquiring a captured image; detecting a person's face in the captured image; performing predetermined processing on the captured image, when the person's face is detected, judging whether the predetermined processing is required to be performed on the captured image, when the person's face is not detected; and performing the predetermined processing even on the captured image from which the person's face has not been detected, when a judgment is made that the predetermined processing is required to be performed.

In accordance with another aspect of the present invention, there is provided a non-transitory computer-readable storage medium having stored thereon a program that is executable by a computer to actualize functions comprising: acquiring a captured image; detecting a person's face in the captured image; performing predetermined processing on the captured image, when the persons face is detected, judging whether the predetermined processing is required to be performed on the captured image, when the person's face is not detected; and performing the predetermined processing even on the captured image from which the person's face has not been detected, when a judgment is made that the predetermined processing is required to be performed.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention can be more deeply understood by the detailed description below being considered together with the following drawings.

FIG. 2A and FIG. 2B are outer appearance views of the imaging apparatus structured such that a user can take a so-called selfie, that is, a self-portrait while viewing a live view image, in which a frame has been closed in FIG. 2A, and has been opened in FIG. 2B;

DETAILED DESCRIPTION OF THE PREFERRED EMBODIMENTS

Embodiments of the present invention will hereinafter be described with reference to the drawings.

First Embodiment

First, a first embodiment of the present invention is described with reference to FIG. 1 to FIG. 4.

In the first embodiment, the present invention has been applied in an imaging apparatus 100 as an image processing apparatus. As will be described in detail later, the first embodiment is characterized in that, in a case where an image (still image) captured in response to a photographing instruction operation (release operation) is acquired and subjected to photographing processing to generate a photographic image, if a person's face is detected in the captured image when photographing processing is performed on the captured image, predetermined image processing is performed on the captured image as predetermined processing. If a person's face is not detected, it is judged whether the predetermined image processing is required to be performed on the captured image and, when a judgment is made that the predetermined image processing is required to be performed, an instruction to perform the predetermined image processing on the captured image is given.

Figure 1:
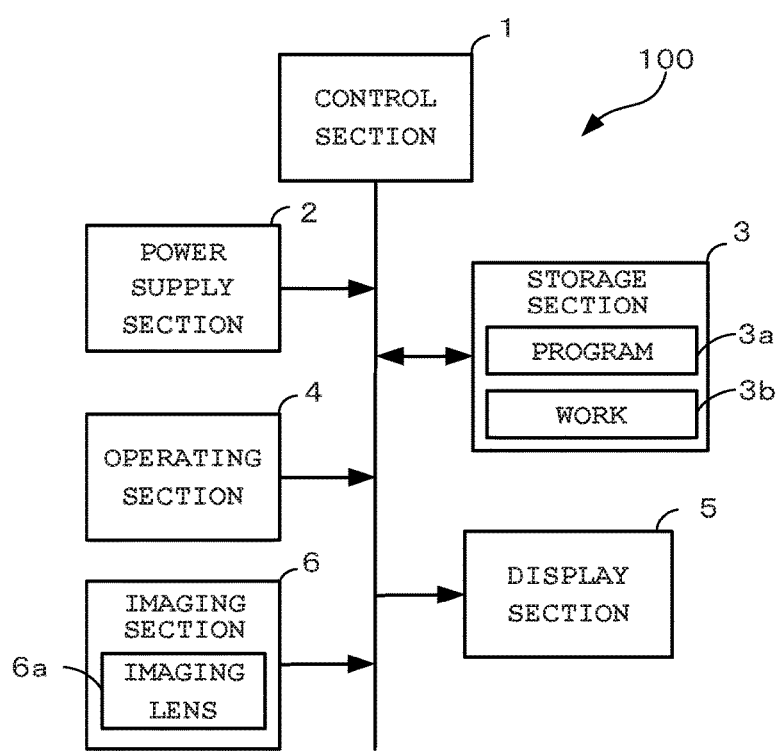
FIG. 1 is a block diagram showing basic components of an imaging apparatus in which the present invention has been exemplarily applied in the imaging apparatus as an image processing apparatus.

FIG. 1 is a block diagram showing basic components of the imaging apparatus 100.

This imaging apparatus 100 is a digital camera having, in addition to basic functions such as an imaging function capable of taking an image of a subject with high definition and an image replay function for reading and replaying an arbitrary photographic image recorded and stored (recorded image), a face detecting function for detecting a person's face while analyzing a captured image (live view image) and a facial beautification processing function for performing processing called skin beautification or skin whitening on a captured image (live view image).

The above-described face detecting function is a function for recognizing a person's face by comprehensively judging the contour of the person's face and the shape, positional relation, and the like of parts (such as eyes, mouth, nose, and forehead) constituting the face. When the person's face has been oriented substantially front with respect to the imaging apparatus 100 (digital camera), a judgment can be made that the person's face is in a captured image (still image: live view image). However, when the person's face has been oriented sideways (for example, toward an exact lateral direction) with respect to the imaging apparatus 100 (digital camera), a judgment may be made that the person's face is not in a captured image (live view image). This face detecting function is a generally-used technique in digital cameras, and this known technique is used in the present embodiment. Therefore, its specific description is omitted herein. Also, the above-described facial beautification processing function is a function for performing facial beautification processing on a captured image (live view image), that is, a function for performing processing called skin beautification or skin whitening not only on a person's face in a captured image but also on portions with skin color such as the neck and the arms.

In the present embodiment, for example, when the user is sequentially capturing a plurality of images so as to take selfies, that is, self-portraits while changing the orientation of the face and the position of the digital camera for each photographing instruction operation (release operation), if the user's face is detected in a captured image as a result of face detection performed on each captured image, predetermined image processing (facial beautification processing) is performed on the captured image. When the users face is no longer detected by the user changing the orientation and position of the face with respect to the digital camera, it is judged whether the predetermined image processing (facial beautification processing) is required to be performed on that captured image and, when a judgment is made that the processing is required to be performed, the facial beautification processing is performed on the captured image.

A control section 1 in FIG. 1 operates by power supply from a power supply section (secondary battery) 2, and controls the entire operation of the imaging apparatus 100 (digital camera) by following various programs stored in a storage section 3. In the control section 1, a CPU (Central Processing Unit), a memory, and the like not depicted are provided. The storage section 3 is structured to have, for example, a ROM (Read Only Memory), a flash memory, and the like, and has a program memory 3a having stored therein a program for achieving the present embodiment in accordance with an operation procedure depicted in FIG. 3 and FIG. 4 described later and various application programs, and a work memory 3b that temporarily stores data such as a flag. This storage section 3 may be structured to include a removable portable memory (recording medium) such as an SD (Secure Digital) card or an IC (Integrated Circuit) card capable of storing photographic images, or may be structured to include, although not shown, a storage area on a predetermined server apparatus side in a case where the digital camera is connected to a network by a communication function. The portable memory such as an SD card is a memory for storing a plurality of high-definition photographic images (recorded images).

An operating section 4 in FIG. 1 includes, although not depicted, various keys such as a power supply key for turning power supply ON/OFF, a release key for giving an instruction for photographing, and a mode specifying key for specifying an operation mode from various operation modes. In response to an operation on one of these keys, the control section 1 performs, for example, processing for turning power supply ON/OFF, photographing processing, or processing for specifying a mode. Note that, in addition to specifying a mode allowing photographing (REC mode) or a mode for replaying a photographic image (recorded image) (PLAY mode) as a basic operation mode, the mode specifying key can specify, for example, a facial beautification photographing mode for operating the facial beautification processing function in the REC mode. In response to a key operation on the operating section 4, the control section 1 performs mode change processing, photographing processing, and the like. A display section 5 in FIG. 1 is a high-definition liquid crystal, an organic electro luminescence, or the like for displaying an image, and serves as a monitor screen (live view screen) for displaying a captured image (live view image) in real time or a replay screen for replaying a photographic image (recorded image).

An imaging section 6 in FIG. 1, which can capture an image of a photographic subject with high definition by forming an image of the subject from an imaging lens 6a at an image pickup element (such as CCD or CMOS) not depicted, has various sensors, an analog processing section, and a digital processing section. In response to a photographing instruction operation (release operation), the control section 1 acquires a captured image from the imaging section 6, performs photographing processing, and thereby generates a photographic image. That is, the control section 1 acquires an image captured by the imaging section 6 as a RAW (Bayer pattern) image, performs development processing, such as data interpolation (demosaic), color conversion, and white balance and sharpness adjustment, on this RAW image, performs facial beautification processing as predetermined image processing concurrently with the development processing, and thereby generates a photographic image. Then, after performing image compression processing on the generated image (photographic image) for conversion into a standard file format, the control section 1 records and stores the photographic image in the recording medium of the storage section 3. Also, when a person's face is detected in the facial beautification photographing mode for operating the facial beautification processing function, the control section 1 performs facial beautification processing not only on the RAW image but also on the live view image.

FIG. 2A and FIG. 2B are outer appearance views of the imaging apparatus 100 structured such that the user can take a so-called selfie, that is, a self-portrait while viewing a live view image.

A housing 11 in FIG. 2A and FIG. 2B, which forms the imaging apparatus 100, is structured to have a thin, rectangular display block 11a, a frame block 11b in a rectangular frame shape surrounding the periphery of the display block 11a, and a lens block 11c coupling the display block 11a and the frame block 11b together. A center portion at one end of the display block 11a (a center portion at an upper end in the depicted example) and a center portion at one end of the lens block 11c (a center portion at a lower end in the depicted example) are attached together so to be rotatable in a lateral direction via a hinge section (not depicted) for lateral rotation. Also, an inner side of both ends of the frame block 11b (an inner side of upper portions on left and right sides in the example of FIG. 2A) and both ends of the lens block 11c (left and right side portions in the example of FIG. 2A) are attached together so as to be rotatable in a longitudinal direction via a hinge section (not depicted) for longitudinal rotation.

The display section 5 is arranged in a center portion of the display block 11a. At a center portion of the lens block 11c, the imaging lens 6a forming the imaging section 6 is arranged. By rotating the display block 11a via the above-described hinge section for lateral rotation by 180 degrees with respect to the lens block 11c, the display section 5 and the imaging lens 6a can be oriented to the same direction or opposite directions. Note that a structure may be adopted in which the display block 11a and the lens block 11c are integrated to form a main body block, and the inner side of both ends of the frame block 11b (the inner side of upper portions on the left and right sides in the example of FIG. 2A) and both ends of the main block (left and right side portions in the example of FIG. 2A) are rotatably attached in the longitudinal direction via the hinge section (not depicted) for longitudinal rotation. FIG. 2A depicts a state in which the frame block 11b is closed with respect to the display block 11a with the display section 5 and the imaging lens 6a being oriented to opposite directions by 180 degrees for normal photographing, and FIG. 2B depicts a state in which the frame block 11b is opened with respect to the display block 11a with the display section 5 and the imaging lens 6a being oriented to the same direction for taking selfies.

Figure 3:
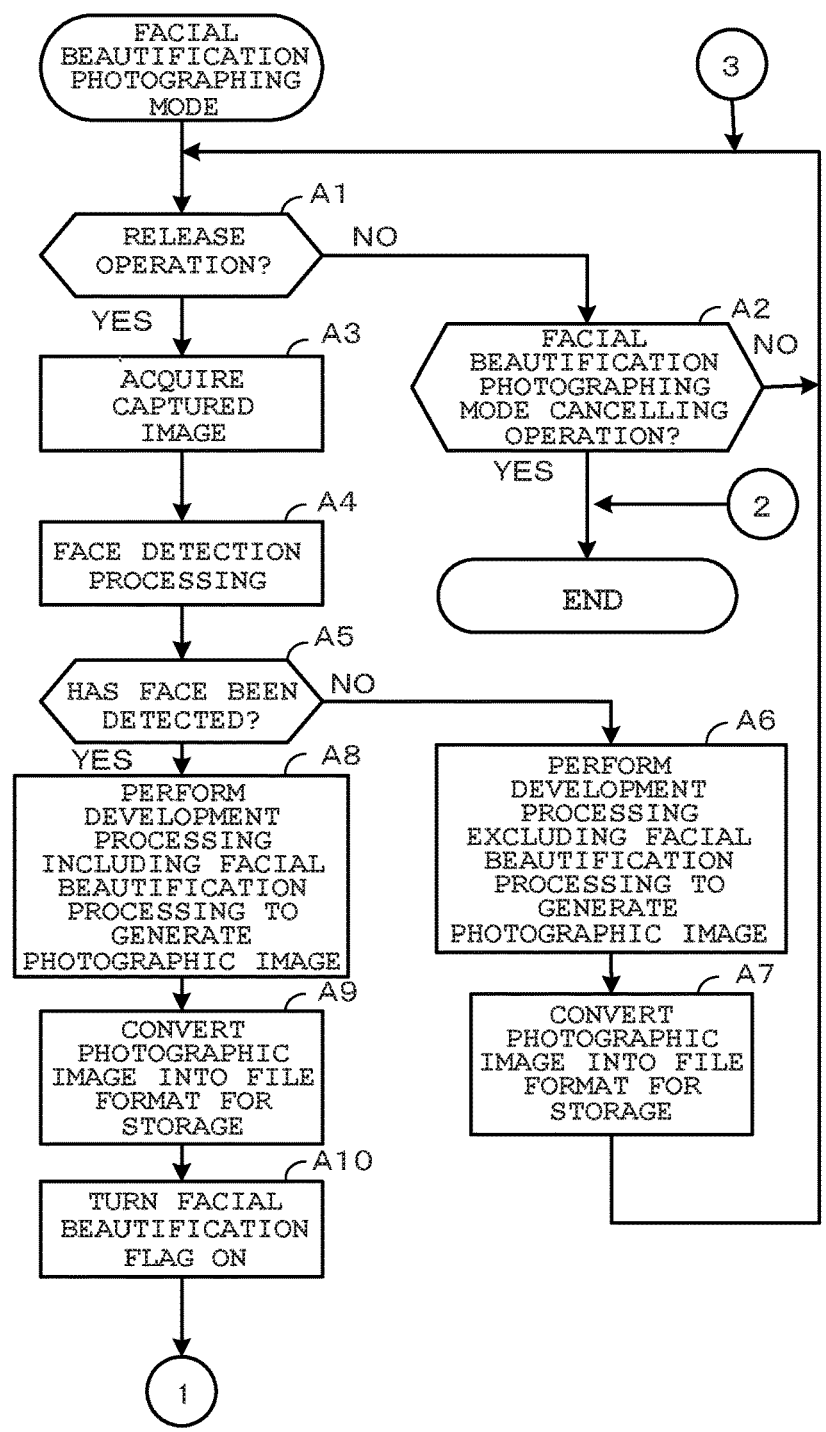
FIG. 3 is a flowchart for describing an operation of the imaging apparatus (characteristic operation of a first embodiment) which is started when a facial beautification photographing mode is specified.
Figure 4:
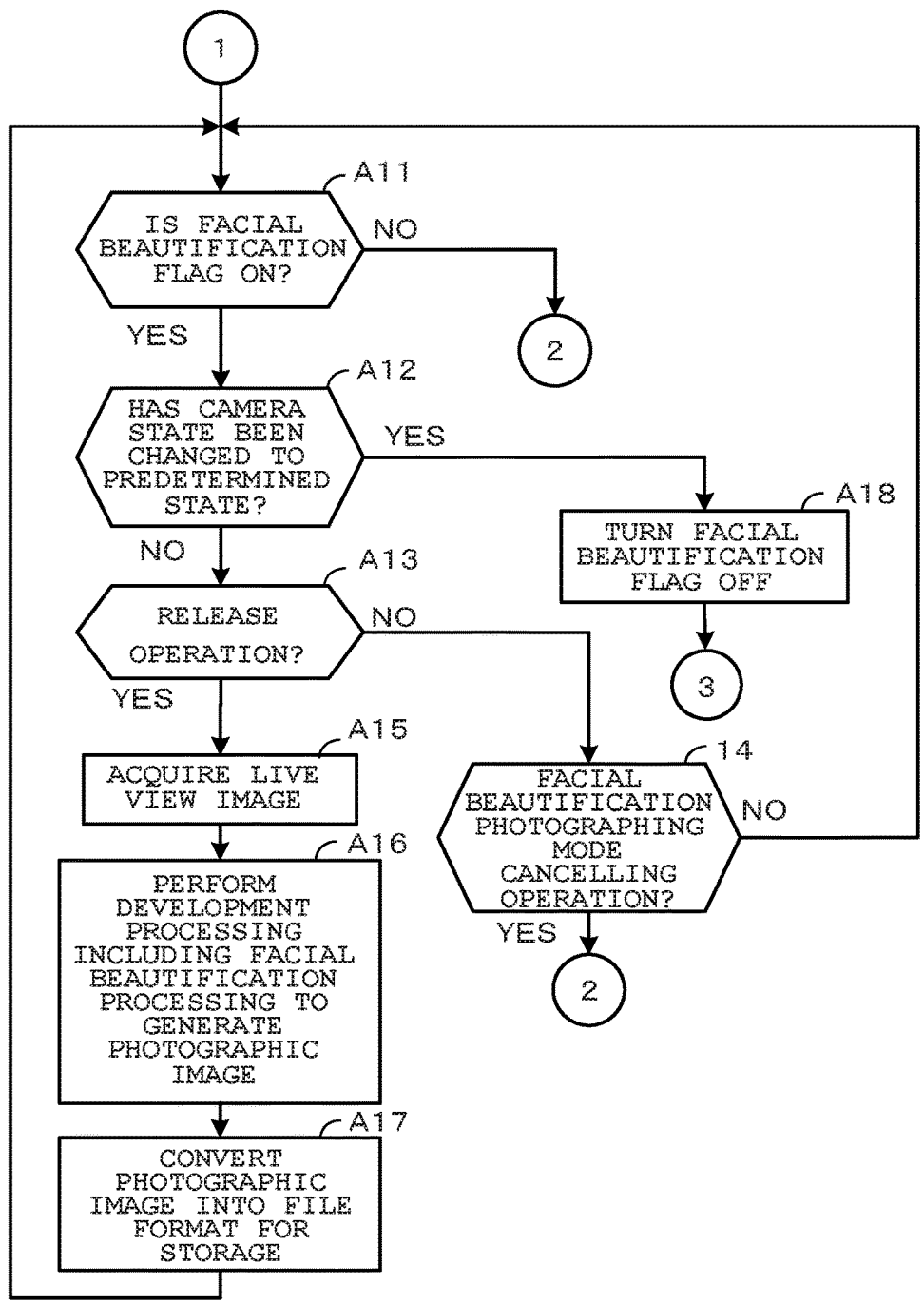
FIG. 4 is a flowchart following that of FIG. 3.

Next, the operation concept of the imaging apparatus 100 (digital camera) in the first embodiment is described with reference to a flowchart depicted in FIG. 3 and FIG. 4. Here, each function described in these flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. This applies to other embodiments described later. FIG. 3 and FIG. 4 are flowcharts outlining the operation of the characteristic portion of the present embodiment from among all of the operations of the imaging apparatus 100. After exiting these flows of FIG. 3 and FIG. 4, the control section 1 returns to the main flow (omitted in the drawings) of the overall operation.

FIG. 3 and FIG. 4 depict a flowchart for describing an operation of the imaging apparatus 100 (characteristic operation of the first embodiment) which is started when the facial beautification photographing mode is specified. In the following descriptions, this characteristic operation of the first embodiment is explained by using an example where the user sequentially photographs a plurality of images of the user himself or herself while changing the orientation of the face and the position of the digital camera for each release operation in the facial beautification photographing mode.

First, the control section 1 judges whether a release operation has been performed (Step A1 of FIG. 3) and whether an operation for cancelling the facial beautification photographing mode has been performed (Step A2). Here, when judged that an operation for cancelling the facial beautification photographing mode has been performed (YES at Step A2), the control section 1 exits from the flow of FIG. 3 and FIG. 4. When judged that a release operation has been performed (YES at Step A1), the control section 1 acquires a captured image (live view image) from the imaging section 6 (Step A3).

Then, by analyzing the acquired captured image (live view image), the control section 1 performs processing for detecting a person's face (Step A4), and judges whether a person's face has been detected in the captured image (whether a face is included) (Step A5). That is, the control section 1 comprehensively judges the shape, positional relation, and the like of the eyes, mouth, nose, forehead, and the like of a person so as to judge whether a person's face is included in the captured image.

Here, when a person's face has not been detected in the captured image, for example, when a person's face is not included therein or when a person's face included therein is not oriented substantially front (for example within approximately 45 degrees with respect to the front) (NO at Step A5), the control section 1 performs development processing without facial beautification processing to generate a photographic image (Step A6). That is, the control section 1 performs development processing, such as data interpolation (demosaic), color conversion, and white balance and sharpness adjustment, on the image captured by the imaging section 6 to generate a photographic image. Then, after performing image compression processing on the generated image (photographic image) for conversion into a standard file format, the control section 1 records and stores the photographic image in the recording medium of the storage section 3 (Step A7), and then returns to Step A1 described above.

On the other hand, when judged that a person's face has been detected in the captured image (YES at Step A5), the control section 1 proceeds to the next Step A8 to perform development processing including facial beautification processing to generate a photographic image. That is, the control section 1 performs facial beautification processing on the captured image as predetermined image processing, together with the above-described development processing. As this facial beautification processing, for example, image processing of correcting image exposure, color saturation, and brightness is performed on portions with the skin color, such as not only the person's face but also the neck and arms, for skin whitening, soft focusing, and the like, and thereby makes wrinkles, rough skin, and blotches inconspicuous. Alternatively, the facial beautification processing may be performed only on the detected face area. Then, after performing image compression processing on the generated image (photographic image) for conversion into a standard file format, the control section 1 records and stores the photographic image in the recording medium of the storage section 3 (Step A9). Upon detecting a person's face and performing facial beautification processing as predetermined image processing as described above, the control section 1 sets, as information indicating whether predetermined image processing (facial beautification processing) is required to be performed, a facial beautification flag (not depicted) such that it indicates that predetermined image processing is required (ON) (Step A10).

Then, the control section 1 proceeds to Step A11 of FIG. 4 to judge whether the above-described facial beautification flag is ON. Here, since the facial beautification flag is ON (YES at Step A11), the control section 1 judges whether the state of the imaging apparatus 100 (digital camera) has been changed to a predetermined state (Step A12). Here, the state of the imaging apparatus 100 (digital camera) is judged to have been changed to a predetermined state when, for example, the photographing environment has been significantly changed and/or the positional relation between the imaging apparatus 100 (digital camera) and the subject (person) and the viewing angle with respect to the subject (person) have been significantly changed. That is, the control section 1 judges whether the situation has been changed to a situation where an intention of continuing photographing which requires facial beautification processing has been lost.

Examples of this predetermined state include a state where a light source judgment for white balance in AWB (auto white balance) adjustment has been changed, a state where a light value data (LV data) in AE (automatic exposure) adjustment has been abruptly changed (for example, a total of luminance values for each pixel of the captured image has been changed by 30% or more in three frames), a state where the rotation of the lens section (the positional relation (orientation) between the imaging lens 6a and the display section 5) has been changed, and a state where a focus distance by AF (auto focusing) has been abruptly changed (changed by 100% or more).

When judged that the imaging apparatus 100 (digital camera) has not been changed to the predetermined state (NO at Step A12), the control section 1 judges whether a release operation has been performed (Step A13) and whether an operation for cancelling the facial beautification photographing mode has been performed (Step A14). Here, when judged that an operation for cancelling the facial beautification photographing mode has been performed (YES at Step A14), the control section 1 exits from the flow of FIG. 3 and FIG. 4. When judged that a release operation has been performed (YES at Step A13), the control section 1 acquires a captured image (live view image) from the imaging section 6 (Step A15), and performs development processing including the above-described facial beautification processing on this captured image to generate a photographic image (Step A16). Then, after performing image compression processing on the generated image (photographic image) for conversion into a standard file format, the control section 1 records and stores the photographic image in the recording medium of the storage section 3 (Step A17), and returns to Step A11 to judge whether the facial beautification flag is ON.

During this sequential photographing for taking selfies, when the information (facial beautification flag), which indicates whether the predetermined image processing (facial beautification processing) is required to be performed, has been set to indicate that the processing is required (ON) (YES at Step A11), the control section 1 judges that facial beautification processing is required to be performed without performing the detection of a person's face, on condition that the imaging apparatus 100 (digital camera) has not been changed to the predetermined state (NO at Step A12), and performs facial beautification processing on the captured image. That is, even when a person's face is not detected because the person's face is oriented sideways or the like, if the ON state of the facial beautification flag is being maintained, facial beautification processing is performed on each of the images sequentially captured during this period, unless the state of the imaging apparatus 100 (digital camera) is changed to the predetermined state. On the other hand, when the state of the imaging apparatus 100 (digital camera) has been changed to the predetermined state (YES at Step A12), the control section 1 turns the facial beautification flag OFF (Step A18), and then returns to Step A1 described above to repeat the above-described processing.

As described above, in the first embodiment, when a person's face is detected in an image captured by the imaging section 6, the control section 1 performs the predetermined image processing on the captured image. When a person's face is not detected, the control section 1 judges whether the predetermined image processing is required to be performed on the captured image and, when judged that the predetermined image processing is required to be performed, gives an instruction to perform the predetermined image processing on the captured image. Therefore, in cases where an image is captured with a person as a photographic subject, the predetermined image processing can be reliably performed on the captured image even if the orientation and position of the person's face are changed.

Also, during sequential photographing where a plurality of photographic images are generated by a captured image being acquired from the imaging section 6 and subjected to photographing processing every time a photographing instruction operation (release operation) is performed, the control section 1 detects a person s face in each captured image acquired every time a release operation is performed. Therefore, for example, even if the user taking selfies sequentially photographs a plurality of images while changing the orientation of the face and the position of the digital camera for each photographing instruction operation (release operation), the predetermined image processing can be reliably performed on each captured image.

Moreover, when the information (facial beautification flag), which indicates whether the predetermined image processing is required to be performed, has been set (turned ON) to indicate that the predetermined image processing is required to be performed on a captured image from which a person's face has been detected, the control section 1 judges that the predetermined image processing is required to be performed even on a captured image where a person's face has not been detected. As a result of this configuration, only an operation of turning the facial beautification flag ON is required in place of an operation of detecting a person's face, so that processing load can be reduced. Also, the face detection processing is required to be performed only once, whereby power saving can be achieved.

Furthermore, when the information (facial beautification flag), which indicates whether the predetermined image processing is required to be performed, has been set (turned OFF) to indicate that the predetermined image processing is not required to be performed on a captured image from which the state change of the imaging apparatus 100 (digital camera) to the predetermined state has been detected, the control section 1 judges that the predetermined image processing is not required to be performed. As a result of this configuration, whether the predetermined image processing is required to be performed can be judged based on whether the state of the imaging apparatus 100 (digital camera) has been changed to the predetermined state.

Still further, the state change of the imaging apparatus 100 (digital camera) to the predetermined state is detected when a light source judgment for white balance is changed, light value data is abruptly changed, the imaging lens section is rotated, or a focus distance is abruptly changed. That is, the state of the imaging apparatus 100 (digital camera) is detected to have been changed to the predetermined state when a photographing environment has been significantly changed or a positional relation between the imaging apparatus 100 (digital camera) and a subject (person) and a viewing angle with respect to the subject have been significantly changed.

Yet still further, the predetermined image processing to be performed on a captured image is processing of performing facial beautification processing on a skin color portion in the captured image. Therefore, it is performed not only on the person's face but also on the neck and arms.

In the above-described first embodiment, the state change of the imaging apparatus 100 (digital camera) to the predetermined state is detected when a light source judgment for white balance is changed, light value data is abruptly changed, the imaging lens section is rotated, or a focus distance is abruptly changed. However, as a matter of course, the change may be a combination thereof, and is not limited thereto.

Also, in the first embodiment, the face detection processing is not performed when the facial beautification flag is ON. However, the face detection processing may be performed even when the facial beautification flag is ON.

Second Embodiment

Next, a second embodiment of the present invention is described with reference to FIG. 5, FIG. 6A, and FIG. 6B.

In the above-described first embodiment, whether the predetermined image processing (facial beautification processing) is required to be performed is judged based on whether the state of the imaging apparatus 100 (digital camera) has been changed to the predetermined state. In the second embodiment, when a person's face is not detected, another detection processing different from the above-described detection processing is performed and, based on the result of this other detection processing, whether the predetermined image processing is required to be performed is judged. That is, when a persons face is detected, the skin color of the face is temporarily stored, and whether the predetermined image processing (facial beautification processing) is required to be performed when a person's face is not detected is judged based on whether an area with a skin color equivalent to the temporarily-stored skin color has a size equal to or larger than a predetermined size. Note that sections that are basically the same or have the same name in the first and second embodiments are provided with the same reference numerals, and therefore descriptions thereof are omitted. Hereafter, the characteristic portions of the second embodiment will be mainly described.

Figure 5:
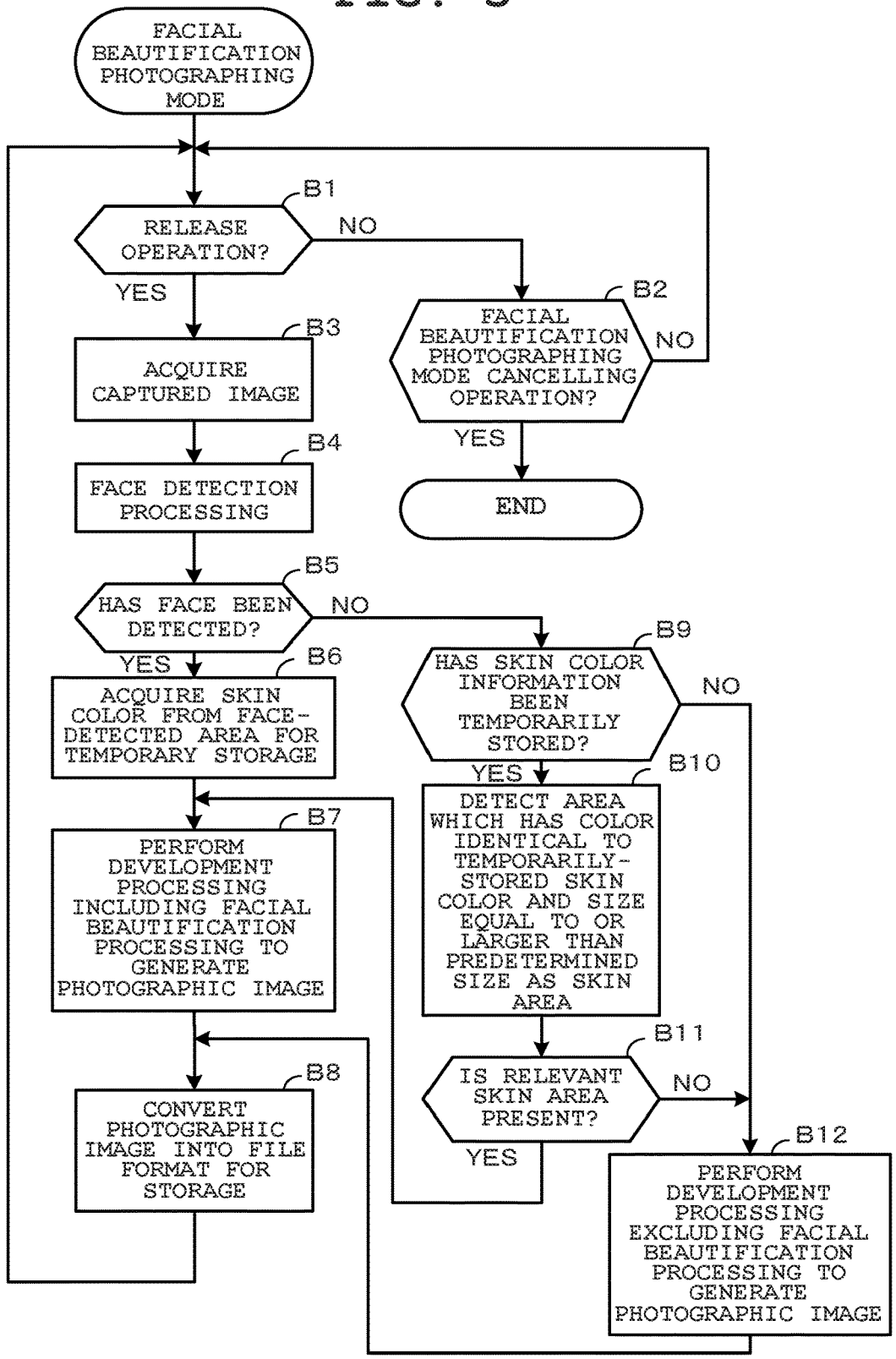
FIG. 5 is a flowchart for describing an operation of an imaging apparatus (characteristic operation of a second embodiment) which is started when a facial beautification photographing mode is specified.
Figure 6A:
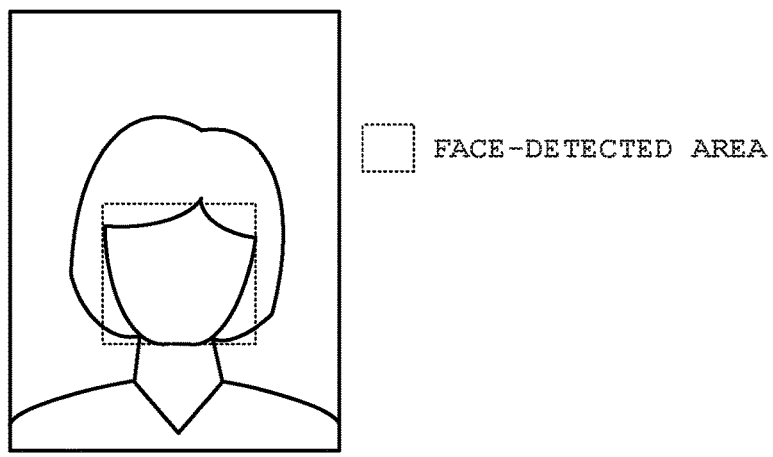
FIG. 6A is a diagram for specifically describing Step B6 of FIG. 5.

FIG. 5 is a flowchart for describing an operation of an imaging apparatus 100 (characteristic operation of the second embodiment) which is started when the facial beautification photographing mode is specified.

First, in a state where the facial beautification photographing mode has been specified, the control section 1 judges whether a release operation has been performed (Step B1) and whether an operation for cancelling the facial beautification photographing mode has been performed (Step B2). Here, when judged that an operation for cancelling the facial beautification photographing mode has been performed (YES at Step B2), the control section 1 exits from the flow of FIG. 5. When judged that a release operation has been performed (YES at Step B1), the control section 1 acquires a captured image (live view image) from the imaging section 6 (Step B3).

Then, by analyzing the acquired captured image (live view image), the control section 1 performs processing for detecting a person's face (Step B4), and judges whether a person's face is included in the captured image (Step B5). Here, when judged that a person's face is included in the captured image (YES at Step B5), the control section 1 specifies a face-detected area (a rectangular area surrounded by a broken line in FIG. 6A), acquires skin color information from the face-detected area, and temporarily stores the skin color information in the work memory 3b (Step B6). In this case, in order to eliminate part of blotches, moles, and the like, the control section 1 acquires the color of an area that has the largest size among areas having an equivalent color (identical or similar color) in the face-detected area, as the skin color information. Note that this temporarily-stored skin color information may be information regarding one color or information indicating a color range.

Next, the control section 1 performs development processing including facial beautification processing on the captured image to generate a photographic image (Step B7). The facial beautification processing in this case is similar to that of the first embodiment, in which processing of correcting image exposure, color saturation, brightness is performed on portions with the skin color, such as not only the person's face but also the neck and arms, for skin whitening, soft focusing, and the like, and thereby makes wrinkles, rough skin, and blotches inconspicuous. Note that the facial beautification processing may be performed only on the detected face area. Next, after performing image compression processing on the generated image (photographic image) for conversion into a standard file format, the control section 1 records and stores the photographic image in the recording medium of the storage section 3 (Step B8). Then, the control section 1 returns to Step B1 described above to repeat the above-described operation.

Here, as a result of acquiring the image captured by the release operation (YES at Step B1) (Step B3) and performing face detection processing on this captured image (Step B4), if the control section 1 does not detect a person's face (NO at Step B5), the control section 1 proceeds to Step B9 to judge whether skin color information has been temporarily stored. That is, the control section 1 judges whether face detection has been performed before the current release operation and skin color information has been temporarily stored in the work memory 3b. When judged that skin color information has been temporarily stored (YES at Step B9), the control section 1 proceeds to Step B10. At Step B10, the control section 1 performs processing of reading out the skin color information temporarily stored at the time of the above-described face detection, and detecting an area that has a color equivalent to that in the skin color information (a color identical or similar to the color in the skin color information) and a size equal to or larger than a predetermined size (for example, an area equal to or larger than 5% of the entire captured image) as a skin area. Then, the control section 1 judges whether a skin area meeting the above-described conditions has been detected in the captured image as a result of the detection processing (Step B11).

Figure 6B:
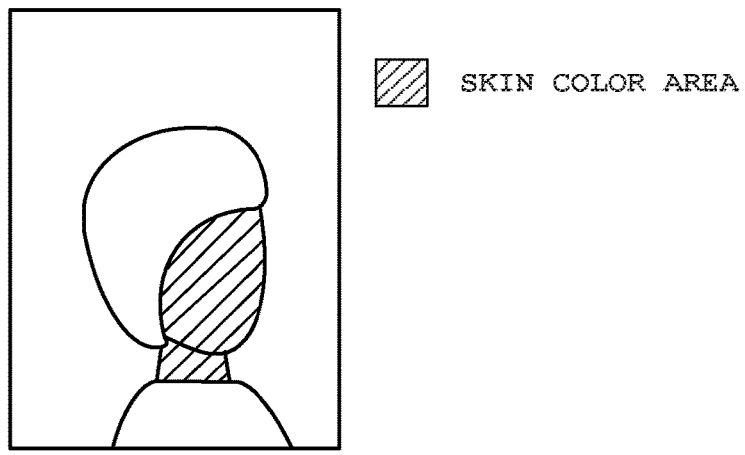
FIG. 6B is a diagram for specifically describing Step B10 thereof.

FIG. 6B shows the case where the person's face has been oriented sideways and therefore cannot be detected in the captured image. Here, as a skin area, an area has been detected in which a color equivalent to that in the skin color information (the color of the face) temporarily stored at the time of the face detection continues and whose size is equal to or larger than the predetermined size. The area with diagonal lines (face and neck areas) in FIG. 6B indicate the detected skin area. Here, if a relevant skin area is not detected (NO at Step B11), the control section 1 performs development processing without facial beautification processing to generate a photographic image (Step B12), performs image compression processing on the generated image (photographic image) for conversion into a standard file format, and then records and stores the photographic image in the recording medium of the storage section 3 (Step B8). Then, the control section 1 returns to Step B1 described above.

Similarly, when no skin color information has been temporarily stored (NO at Step B9), the control section 1 performs development processing without facial beautification processing to generate a photographic image (Step B12), performs image compression processing on the generated image (photographic image) for conversion into a standard file format, and then records and stores the photographic image in the recording medium of the storage section 3 (Step B8). Then, the control section 1 returns to Step B1 described above to repeat the above-described operation.

On the other hand, even when no face is detected with the skin color information (skin color of the face) being temporarily stored at the time of the face detection, if the control section 1 detects a skin area (YES at Step B11) by detecting an area which has color information equivalent to the temporarily-stored skin color information and a size equal to or larger than the predetermined size as the person's skin area (Step B10), the control section 1 judges that facial beautification processing is required to be performed, and proceeds to Step B7 to perform development processing including facial beautification processing on the captured image to generate a photographic image. In this case, for example, when there is a plurality of skin areas that have sizes equal to or larger than the predetermined size, an area having the largest size is detected as a face area. As a result, facial beautification processing can be performed only on the face area. Next, after performing image compression processing on the generated image (photographic image) for conversion into a standard file format, the control section 1 records and stores the photographic image in the recording medium of the storage section 3 (Step B8). Then, the control section 1 returns to Step B1 described above to repeat the above-described operation.

As described above, in the second embodiment, when a person's face is not detected, the control section 1 performs another detection processing different from the above-described detection processing and, based on the result of this other detection processing, judges whether the predetermined image processing is required to be performed. Therefore, versatile detection can be performed without sticking to univocal detection such as face detection processing.

Also, when skin color information (skin color of a detected face) has been temporarily stored at the time of face detection, the control section 1 performs, as the above-described other detection processing, processing for detecting whether an area with a skin color equivalent to the temporarily-stored skin color has a size equal to or larger than the predetermined size and, based on the detection result, judges whether facial beautification processing is required to be performed. As a result of this configuration, even if a face is not detected in a captured image, a skin portion can be appropriately specified in the captured image and facial beautification processing can be performed.

Third Embodiment

Next, a third embodiment of the present invention is described with reference to FIG. 7A, FIG. 8A, and FIG. 8B.

In the third embodiment, when a person's face is not detected, another detection processing different from the above-described detection processing is performed and, based on the result of this other detection processing, whether the predetermined image processing is required to be performed is judged, as with the above-described second embodiment. In addition, in the third embodiment, as the other detection processing when a person's face is not detected, a hair color when a person's face is detected is temporarily stored, and whether an area with a color equivalent to the temporarily-stored hair color has a size equal to or larger than a predetermined size is detected. Then, based on the detection result, whether the predetermined image processing (facial beautification processing) is required to be performed is judged. Note that sections that are basically the same or have the same name in the first and third embodiments are provided with the same reference numerals, and therefore descriptions thereof are omitted. Hereafter, the characteristic portions of the third embodiment will be mainly described.

Figure 7:
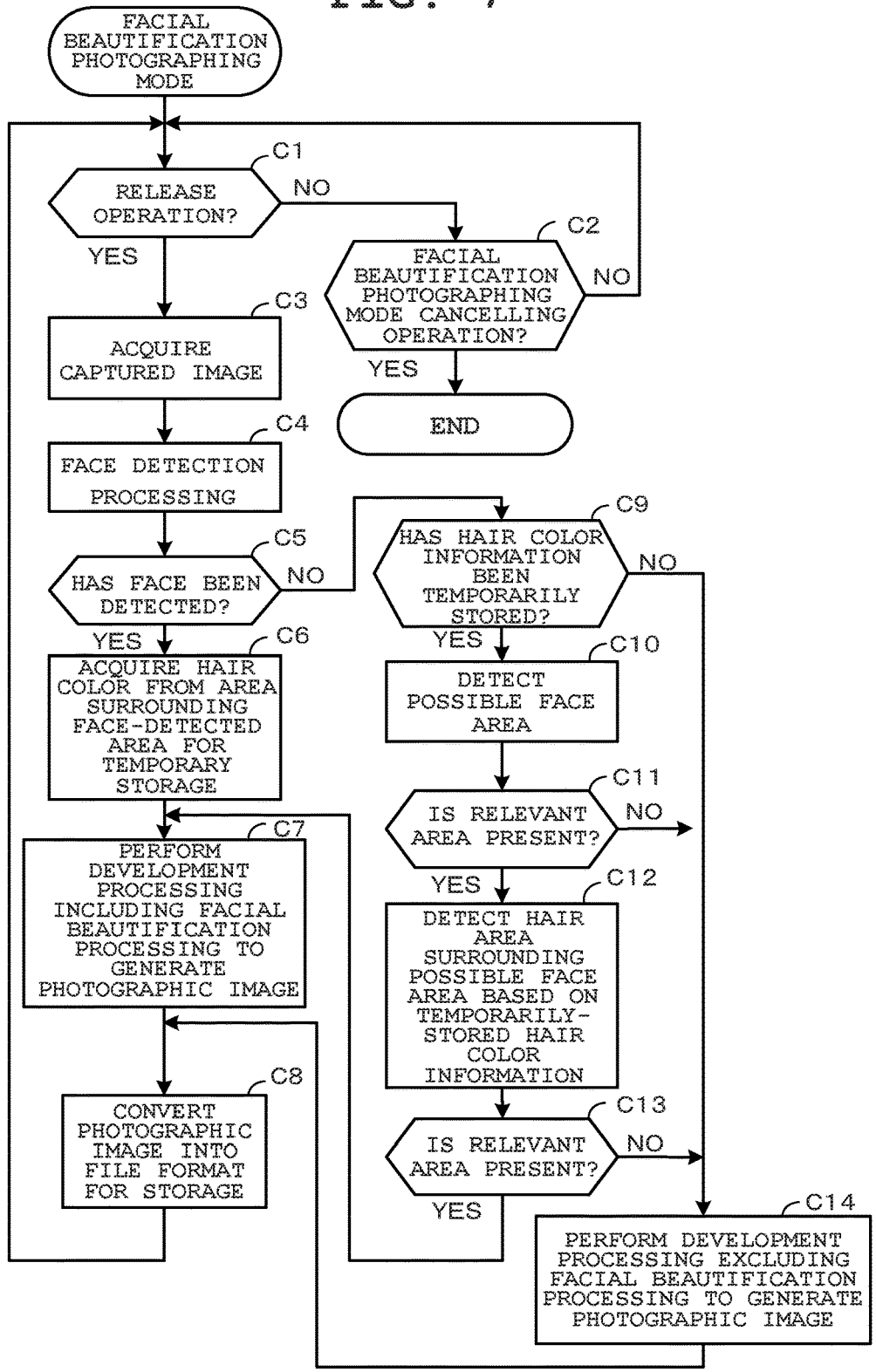
FIG. 7 is a flowchart for describing an operation of an imaging apparatus (characteristic operation of a third embodiment) which is started when a facial beautification photographing mode is specified.
Figure 8A:
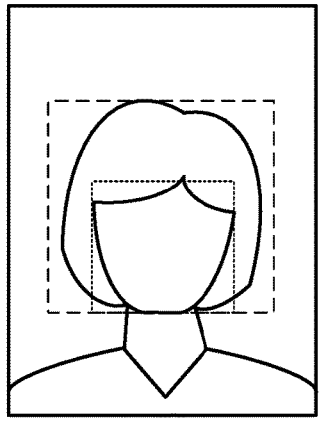
FIG. 8A is a diagram for specifically describing Step C6 of FIG. 7.
Figure 8B:
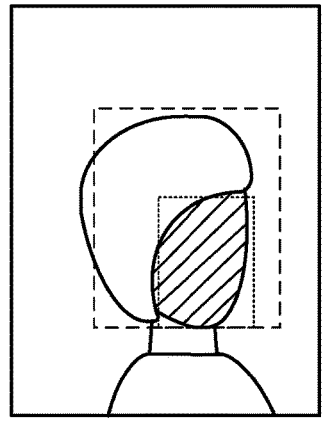
FIG. 8B is a diagram for specifically describing Step C12 thereof.

FIG. 7 is a flowchart for describing an operation of an imaging apparatus 100 (characteristic operation of the third embodiment) which is started when the facial beautification photographing mode is specified. Note that FIG. 7 is basically the same as FIG. 5 of the second embodiment, and therefore basically similar portions are briefly described herein.

First, in a state where the facial beautification photographing mode has been specified, the control section 1 judges whether a release operation has been performed (Step C1) and whether an operation for cancelling the facial beautification photographing mode has been performed (Step C2). Here, when judged that an operation for cancelling the facial beautification photographing mode has been performed (YES at Step C2), the control section 1 exits from the flow of FIG. 7. When judged that a release operation has been performed (YES at Step C1), the control section 1 acquires a captured image (live view image) from the imaging section 6 (Step C3). Then, by analyzing the acquired captured image (live view image), the control section 1 performs processing for detecting a person's face (Step C4), and judges whether a person's face is included in the captured image (Step C5).

When judged that a person's face is included in the captured image (YES at Step C5), the control section 1 specifies face-detected area (a rectangular area surrounded by a fine broken line in FIG. 8A), specifies its surrounding area as a hair area based on the face-detected area, acquires hair color information from the hair area, and temporarily stores the hair color information in the work memory 3*b* (Step C6). Specifically, the hair area is a rectangular area (a rectangular area surrounded by a rough broken line in FIG. 8A) whose length (width) in an X direction is 1.5 times as long as the width of the face-detected area and length (height) in a Y direction is 1.5 times as long as the height of the face-detected area. As a hair area, the control section 1 detects the rectangular area with the lower end of the rectangular area being arranged at a position coinciding with the lower end of the face-detected area.

Among areas where an equivalent color (identical or similar color) continues in the hair area detected as described above, the control section 1 acquires the color of an area having the largest size as hair color information, and temporarily stores the hair color information. Note that this temporarily-stored hair color information may be information regarding one color or information indicating a color range. Then, the control section 1 performs development processing including facial beautification processing on the captured image to generate a photographic image. Here, the control section 1 may perform facial beautification processing only inside the detected face area (Step C7). After performing image compression processing on the generated image (photographic image) for conversion into a standard file format, the control section 1 records and stores the photographic image in the recording medium of the storage section 3 (Step C8). Then, the control section 1 returns to Step C1 described above.

Here, as a result of acquiring the image captured by the release operation (YES at Step C1) (Step C3) and performing face detection processing on this captured image (Step C4), if the control section 1 does not detect a person's face (NO at Step C5), the control section 1 proceeds to Step C9 to judge whether hair color information has been temporarily stored. That is, the control section 1 judges whether face detection has been performed before the current release operation and hair color information has been temporarily stored in the work memory 3*b*. When hair color information has been temporarily stored (YES at Step C9), the control section 1 proceeds to Step C10 to detect a possible face area (a rectangular area surrounded by a fine broken line) in the captured image as depicted in FIG. 8B. In this case, the control section 1 detects, as a possible face area, an area where a color equivalent to (identical to or similar to) a skin color that is used in normal face detection (general skin color) continues. Here, when a possible face area is not detected (NO at Step C11), the control section 1 performs development processing without facial beautification processing to generate a photographic image (Step C14), performs image compression processing on the generated image (photographic image) for conversion into a standard file format, and then records and stores the photographic image in the recording medium of the storage section 3 (Step C8). Then, the control section 1 returns to Step C1 described above to repeat the above-described operation.

When a possible face area is detected (YES at Step C11), the control section 1 reads out the hair color information temporarily stored at the time of the face detection described above, detects an area which has color information equivalent to the hair color information and a size equal to or larger than a predetermined size as the person's hair area (Step C12). That is, the control section 1 detects, as a hair area, a rectangular area (a rectangular area surrounded by a rough broken line in FIG. 8B) which has a color equivalent (identical or similar to) the color of the hair color information excluding the face-detected area and whose length (width) in an X direction is twice as long as the width of the face-detected area and length (height) in a Y direction is 1.5 times as long as the height of the face-detected area, with the lower end of the rectangular area being arranged at a position coinciding with the lower end of the possible face area.

Then, the control section 1 judges whether a hair area meeting the above-described conditions has been detected in the captured image, that is, whether an area occupied by the hair color temporarily stored at the time of the face detection by an amount (for example, 30%) by which it can be assumed as hair has been detected (Step C13). Here, when a hair area is not detected (NO at Step C13), the control section 1 performs development processing without facial beautification processing to generate a photographic image (Step C14), performs image compression processing on the generated image (photographic image) for conversion into a standard file format, and records and stores the photographic image in the recording medium of the storage section 3 (Step C8). Then, the control section 1 returns to Step C1 described above.

Similarly, when no hair color information has been temporarily stored (NO at Step C9), the control section 1 performs development processing without facial beautification processing to generate a photographic image (Step C14), performs image compression processing on the generated image (photographic image) for conversion into a standard file format, and records and stores the photographic image in the recording medium of the storage section 3 (Step C8). Then, the control section 1 returns to Step C1 described above to repeat the above-described operation.

On the other hand, even when no face is detected with the hair color information being temporarily stored at the time of the face detection, if the control section 1 detects a hair area (YES at Step C13) by detecting an area which has color information equivalent to the hair color information and a size equal to or larger than the predetermined size as the person's hair color area (Step C12), the control section 1 judges that facial beautification processing is required to be performed, and proceeds to Step C7 to perform development processing including facial beautification processing on the possible face area in the captured image to generate a photographic image. That is, when there is a hair area surrounding the possible face area, the control section 1 judges that the possible face area is a face area, and performs facial beautification processing on that possible face area. Then, after performing image compression processing on the generated image (photographic image) for conversion into a standard file format, the control section 1 records and stores the photographic image in the recording medium of the storage section 3 (Step C8). Then, the control section 1 returns to Step C1 described above to repeat the above-described operation.

As described above, in the third embodiment, when a person's face is detected, the control section 1 temporarily stores its hair color. When a person's face is not detected, the control section 1 specifies a possible face area in a captured image and, if an area which has a color equivalent to the temporarily-stored skin color and a size equal to or larger than the predetermined size is present on the periphery of the possible face area, detects this area as a hair area. Then, based on the detection result, the control section 1 judges whether facial beautification processing is required to be performed. As a result of this configuration, when there is a hair area on the periphery of a possible face area, the control section 1 can judge the possible face area as a face area and perform facial beautification processing on that area. Accordingly, from a person s hair color, his or her face portion can be appropriately specified in a captured image, and facial beautification processing can be performed.

In the above-described third embodiment when a person's face is not detected, the control section 1 detects a possible face area. In addition, if a hair area is present on the periphery of this possible face area, the control section 1 judges the possible face area as a face area and performs facial beautification processing. However, a configuration may be adopted in which the control section 1 detects a hair area based on a temporarily-stored hair color and, based on this hair area, detects a face area on the periphery thereof and perform facial beautification processing.

Fourth Embodiment

Next a fourth embodiment of the present invention is described with reference to FIG. 9.

In the fourth embodiment, when a person's face is not detected, another detection processing different from the above-described detection processing is performed and, based on the result of this other detection processing, whether the predetermined image processing is required to be performed is judged, as with the second and third embodiments described above. In addition, in the fourth embodiment as the other detection processing when a person's face is not detected, aberration correction processing is performed based on information for correcting the aberration of the imaging lens 6a constituting the imaging section 6. Also, a person's face is detected in the corrected captured image and, based on the detection result, whether the predetermined image processing (facial beautification processing) is required to be performed is judged. In this aberration correction processing, distortion aberration is corrected by a known technique. Note that sections that are basically the same or have the same name in the first and fourth embodiments are provided with the same reference numerals, and therefore descriptions thereof are omitted. Hereafter, the characteristic portions of the forth embodiment will be mainly described.

Figure 9:
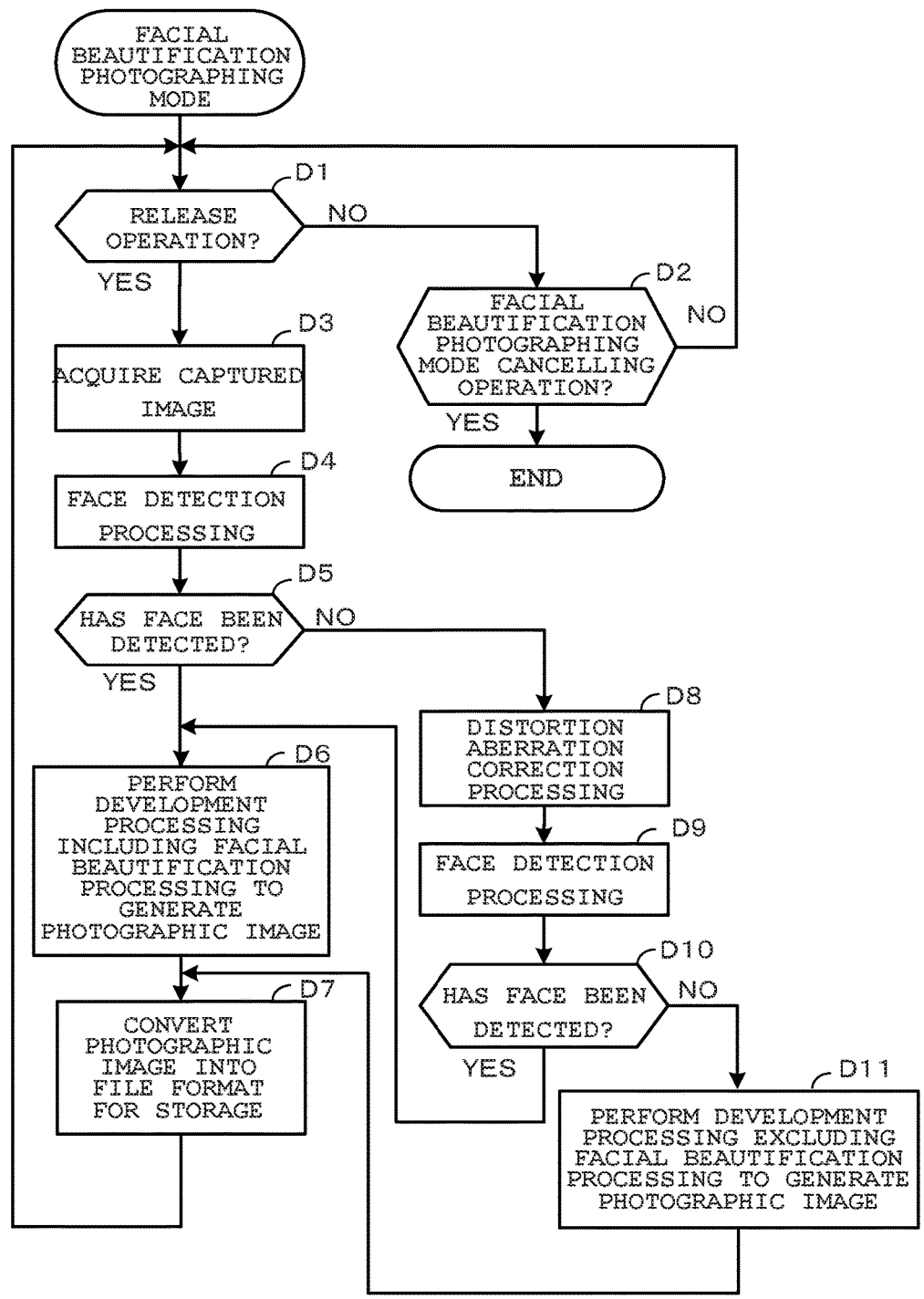
FIG. 9 is a flowchart for describing an operation of an imaging apparatus (characteristic operation of a fourth embodiment) which is started when a facial beautification photographing mode is specified.

FIG. 9 is a flowchart for describing an operation of an imaging apparatus 100 (characteristic operation of the fourth embodiment) which is started when the facial beautification photographing mode is specified. Note that FIG. 9 is basically the same as FIG. 5 of the second embodiment, and therefore basically similar portions are briefly described herein.

First, in a state where the facial beautification photographing mode has been specified, the control section 1 judges whether a release operation has been performed (Step D1) and whether an operation for cancelling the facial beautification photographing mode has been performed (Step D2). When judged that an operation for cancelling the facial beautification photographing mode has been performed (YES at Step D2), the control section 1 exits from the flow of FIG. 9. When judged that a release operation has been performed (YES at Step D1), the control section 1 acquires a captured image (live view image) from the imaging section 6 (Step D3).

Then, by analyzing the acquired captured image (live view image), the control section 1 performs processing for detecting a person's face (Step D4), and judges whether a person's face is included in the captured image (Step D5). When judged that a person's face is included in the captured image (YES at Step D5), the control section 1 performs development processing including facial beautification processing on the captured image to generate a photographic image. Here, the control section 1 may perform facial beautification processing only inside the detected face area (Step D7). After performing image compression processing on the generated image (photographic image) for conversion into a standard file format, the control section 1 records and stores the photographic image in the recording medium of the storage section 3 (Step D7). Then, the control section 1 returns to Step D1 described above.

Here, as a result of acquiring the image captured by the release operation (YES at Step D1) (Step D3) and performing face detection processing on this captured image (Step D4), when the control section 1 does not detect a person's face, such as when the person's face has moved from the center of the imaging lens 6a to its peripheral edge portion (NO at Step D5), the control section 1 proceeds to Step D8 to perform distortion aberration correction processing on the captured image (Step D8). That is, the control section 1 performs distortion aberration correction based on information for correcting the aberration of the imaging lens 6a and detects the person's face again on the corrected captured image (Step D9). In this case, if the person's face is not detected even with distortion aberration correction (NO at Step D10), the control section 1 performs image compression processing without facial beautification processing to generate a photographic image (Step D11). Then, after performing image compression processing on this generated image (photographic image) for conversion into a standard file format, the control section 1 records and stores the photographic image in the recording medium of the storage section 3 (Step D7).

On the other hand, when the person's face is detected as a result of distortion aberration correction (Step D8) (YES at Step D10), the control section 1 judges that facial beautification processing is required to be performed, and proceeds to Step D6 to perform development processing including facial beautification processing on the captured image to generate a photographic image. Note that, as with the first embodiment, the facial beautification processing may be performed not only on the person's face but also on portions with the skin color such as the neck and arms as target. Alternatively, the facial beautification processing may be performed only on the face area. Next after performing image compression processing on the generated image (photographic image) for conversion into a standard file format, the control section 1 records and stores the photographic image in the recording medium of the storage section 3 (Step D7). Then, the control section 1 returns to Step D1 described above to repeat the above-described operation.

As described above, in the fourth embodiment, when a person's face is not detected, the control section 1 performs aberration correction processing based on information for correcting the aberration of the imaging lens 6a constituting the imaging section 6, detects the person's face in the corrected captured image and, from the detection result, judges whether facial beautification processing is required to be performed. Accordingly, even when the person's face has moved to a position with large aberration of the imaging lens 6a, face detection processing can be performed again after aberration correction processing is performed, which makes face detection more reliable.

Note that, if a face is not detected even with the detection processing of the above-described second embodiment for detecting a person's skin area, the control section 1 may perform processing for detecting a person's hair area which is the processing of the above-described third embodiment. In this case, the hair color may also be acquired when the face is first detected.

Also, if a person's face is not detected even with aberration correction which is the detection processing of the above-described fourth embodiment, the control section 1 may perform processing for detecting a person's skin area which is the processing of the above-described second embodiment or processing for detecting a person's hair area which is the processing of the above-described third embodiment. In this case, the skin color of the hair color may also be acquired when the face is first detected.

In each of the above-described embodiments, the present invention has been exemplarily applied in an imaging apparatus 100 including imaging means as an image processing apparatus. However, the present invention is not limited thereto, and a structure may be adopted in which the imaging means is not provided in the image processing apparatus, communication means is provided therein, and an image captured by an external apparatus including imaging means is acquired via the communication means.

Also, in each of the above-described embodiments, the case where an image for storage subjected to predetermined processing is generated has been exemplarily described. However, the present invention is not limited thereto, and an image for display on the display section 5 may be generated.

Also, in each of the above-described embodiments, skin beautification and skin whitening have been exemplarily described as facial beautification processing serving as predetermined image processing. However, the present invention is not limited thereto, and face processing for processing the shape of a face, eyelashes, eyebrows, mouth, and the like may be performed. In addition, the image processing target is not limited to a face, and the background of the face may be corrected in accordance with the skin color of the face.

Moreover, in each of the above-described embodiments, when a person's face is detected, or even when a person's face is not detected, if the predetermined processing is judged to be required, the predetermined image processing (facial beautification processing) is performed as predetermined processing. However, as this predetermined processing, processing may be performed in which information indicating that a person's face is included is added to a generated photographic image for storage. As a result of this configuration, in a case where a stored photographic image is reused, a person's face can be easily judged to be included without processing for re-detecting the persons face, so that processing in accordance with the person's face can be performed.

Furthermore, in each of the above-described embodiments, the user sequentially photographs a plurality of images while changing the orientation of the face and the position of the digital camera for each photographing instruction operation (release operation). Alternatively, the present invention can also be similarly applied to a case where a sequential photographing function is operated in response to a photographing instruction operation. For example, in high-speed photographing of sequentially photographing a plurality of still images with one release operation (for example, three or five images at an interval of three seconds), a person's face may be detected on each captured image. Also, a person's face may be detected during moving image photographing.

Still further, in each of the above-described embodiments, the present invention has been exemplarily applied in an imaging apparatus 100 as an image processing apparatus. However, the present invention is not limited thereto. For example, the present invention can be applied in a camera-function-equipped personal computer, a PDA (personal digital assistant), a tablet terminal apparatus, a portable telephone such as smartphone, an electronic game machine, or a music player.

Yet still further, the "apparatuses" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An image processing apparatus comprising:
a processor that is configured to:
acquire a first captured image;
perform face detection processing to detect a person's face in the acquired first captured image;
judge whether a person's face has been detected in the first captured image;
in a case in which the processor judges that a person's face has been detected in the first captured image, perform predetermined processing related to a person's face on the first captured image;
in a case in which the processor judges that a person's face has been detected in the first captured image, set, as information indicating whether the predetermined processing is required to be performed, information indicating that the predetermined processing is required to be performed; and
in a case in which the information indicating that the predetermined processing is required to be performed has been set, perform the predetermined processing on a second captured image acquired separately from the first captured image without performing the face detection processing on the second captured image.

2. The image processing apparatus according to claim 1, wherein the processor further detects whether a state of the image processing apparatus has been changed to a predetermined state,
wherein the processor sets information indicating that the predetermined processing is not required to be performed on the second captured image acquired when the state of the image processing apparatus is detected to have been changed to the predetermined state, and
wherein the processor does not perform the predetermined processing on the second captured image when the information indicating that the predetermined processing is not required to be performed on the second captured image has been set.

3. The image processing apparatus according to claim 2, wherein the processor detects that the state of the image processing apparatus has been changed to the predetermined state, when a light source judgment for white balance is changed, light value data is abruptly changed, an imaging lens section is rotated, or a focus distance is abruptly changed.

4. The image processing apparatus according to claim 1, wherein the predetermined processing is image processing of performing facial beautification processing on a skin color portion in each of the first captured image and the second captured image.

5. The image processing apparatus according to claim 1, wherein the processor generates a photographic image for storage subjected to the predetermined processing, and
wherein the predetermined processing is processing of adding information indicating that a person's face is included in the generated photographic image for storage.

6. The image processing apparatus according to claim 1, wherein conditions under which the information indicating that the predetermined processing is required to be performed is set, as the information indicating whether the predetermined processing is required to be performed, include a condition that a plurality of captured images including the first captured image and the second captured image are sequentially acquired, and that, in a case in which the first captured image has been acquired before the second captured image, a judgment is made that a person's face has been detected in the first captured image.

7. An image processing method comprising:
acquiring a first captured image;
performing face detection processing for detecting a person's face in the acquired first captured image;
judging whether a person's face has been detected in the first captured image;
in a case where a judgment is made that a person's face has been detected, performing predetermined processing related to a person's face on the first captured image;
in a case in which the processor judges that a person's face has been detected in the first captured image, setting, as information indicating whether the predetermined processing is required to be performed, information indicating that the predetermined processing is required to be performed; and
in a case in which the information indicating that the predetermined processing is required to be performed has been set, performing the predetermined processing on a second captured image acquired separately from the first captured image without performing the face detection processing on the second captured image.

8. A non-transitory computer-readable storage medium having stored thereon a program that is executable by a computer to actualize functions comprising:
acquiring a first captured image;
performing face detection processing for detecting a person's face in the acquired first captured image;
judging whether a person's face has been detected in the first captured image;
in a case in which a judgment is made that a person's face has been detected in the first captured image, performing predetermined processing related to a person's face on the first captured image;
in a case in which the processor judges that a person's face has been detected in the first captured image, setting, as information indicating whether the predetermined processing is required to be performed, information indicating that the predetermined processing is required to be performed; and
in a case in which the information indicating that the predetermined processing is required to be performed has been set, performing the predetermined processing on a second captured image acquired separately from the first captured image without performing the face detection processing on the second captured image.

9. An image processing apparatus comprising:
a processor that is configured to:
acquire a captured image;
perform face detection processing to detect a person's face in the acquired captured image;
judge whether a person's face has been detected in the captured image;
in a case in which the captured image is sequentially acquired, when a judgment is made that a person's face has been detected in a predetermined captured image among a plurality of captured images sequentially-acquired, set, as information indicating whether the predetermined processing is required to be performed, information indicating that the predetermined processing is required to be performed; and
in a case in which the information indicating that the predetermined processing is required to be performed has been set, perform predetermined processing related to a person's face on the predetermined captured image, and perform predetermined processing on another captured image other than the predetermined captured image among the plurality of captured images without performing the face detection processing on said another captured image.

* * * * *